United States Patent
Dick et al.

(10) Patent No.: US 7,813,311 B2
(45) Date of Patent: *Oct. 12, 2010

(54) METHOD AND APPARATUS FOR SYNCHRONIZING BASE STATIONS

(75) Inventors: Stephen G. Dick, Nesconset, NY (US); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1928 days.

This patent is subject to a terminal disclaimer.

(21) Appl. No.: 10/322,133

(22) Filed: Dec. 18, 2002

(65) Prior Publication Data

US 2003/0147362 A1 Aug. 7, 2003

Related U.S. Application Data

(60) Provisional application No. 60/355,739, filed on Feb. 5, 2002.

(51) Int. Cl.
*H04L 7/00* (2006.01)

(52) U.S. Cl. .................. 370/324; 370/350; 375/356; 375/357

(58) Field of Classification Search .............. 370/324, 370/328, 350; 375/356, 357, 358; 455/422, 455/423
See application file for complete search history.

(56) References Cited

U.S. PATENT DOCUMENTS

| | | | |
|---|---|---|---|
| 5,313,457 A | 5/1994 | Hostetter et al. | |
| 5,404,575 A | 4/1995 | Lehto | 455/502 |
| 5,448,570 A | 9/1995 | Toda et al. | |
| 5,784,368 A | 7/1998 | Weigand et al. | |
| 5,793,772 A | 8/1998 | Burke et al. | |
| 5,809,426 A | 9/1998 | Radojevic et al. | |
| 5,822,689 A | 10/1998 | Hwang | |
| 5,828,659 A | 10/1998 | Teder et al. | 370/328 |
| 5,872,774 A | 2/1999 | Wheatley, III et al. | 370/335 |
| 5,881,055 A | 3/1999 | Kondo | |
| 5,881,100 A | 3/1999 | Durrant et al. | |

(Continued)

FOREIGN PATENT DOCUMENTS

EP 0 825 737 2/1998

(Continued)

OTHER PUBLICATIONS

Siemens AG, "Elaborated simulation results for impact on initial cell search by blanking of DwPCH for NodeB synchronization over the air for 1.28 Mcps TDD," TSG-RAN Working Group 1 Meeting #23 TSGR1#22(02)0106 (Jan. 8-11, 2002).

(Continued)

*Primary Examiner*—Dang T Ton
*Assistant Examiner*—Brian O'Connor
(74) *Attorney, Agent, or Firm*—Volpe and Koenig, P.C.

(57) ABSTRACT

Method and apparatus for synchronizing base stations employing an independent synchronizing source or identifying a base station as a master source. An RNC (C-RNC) or a base station may designate one base station or a UE to acquire measurements derived from base stations to achieve synchronization. Synchronization activities may be regularly scheduled or may be undertaken when periodic measurements indicate that a drift value exceeds a given threshold.

8 Claims, 5 Drawing Sheets

U.S. PATENT DOCUMENTS

| | | | |
|---|---|---|---|
| 5,910,948 | A | 6/1999 | Shou et al. |
| 5,973,643 | A | 10/1999 | Hawkes et al. ............... 342/457 |
| 6,014,376 | A | 1/2000 | Abreu et al. |
| 6,038,250 | A | 3/2000 | Shou et al. |
| 6,097,709 | A | 8/2000 | Kuwabara |
| 6,131,030 | A | 10/2000 | Schon et al. |
| 6,201,499 | B1 | 3/2001 | Hawkes et al. ............... 342/387 |
| 6,208,871 | B1 | 3/2001 | Hall et al. |
| 6,223,037 | B1 | 4/2001 | Parkkila |
| 6,243,372 | B1 | 6/2001 | Petch et al. ................. 370/350 |
| 6,246,673 | B1 | 6/2001 | Tiedemann et al. |
| 6,363,060 | B1 | 3/2002 | Sarkar |
| 6,373,834 | B1 | 4/2002 | Lundh et al. ................ 370/350 |
| 6,445,917 | B1* | 9/2002 | Bark et al. ................... 455/423 |
| 6,449,290 | B1 | 9/2002 | Willars et al. ............... 370/507 |
| 6,480,558 | B1 | 11/2002 | Ottosson et al. |
| 6,493,380 | B1 | 12/2002 | Wu et al. |
| 6,504,830 | B1 | 1/2003 | Ostberg et al. |
| 6,567,482 | B1 | 5/2003 | Popovic ...................... 375/343 |
| 6,590,881 | B1 | 7/2003 | Wallace et al. |
| 6,597,914 | B1 | 7/2003 | Silventoinen et al. |
| 6,728,297 | B2 | 4/2004 | Rudolf |
| 6,882,727 | B1 | 4/2005 | Vialen et al. |
| 6,961,398 | B2* | 11/2005 | Dick et al. ................... 375/356 |
| 7,047,011 | B1* | 5/2006 | Wikman ..................... 455/442 |
| 2002/0009168 | A1* | 1/2002 | Dick et al. ................... 375/356 |
| 2002/0075978 | A1 | 6/2002 | Dick et al. |
| 2002/0014039 | A1 | 10/2002 | Demir et al. |
| 2003/0203745 | A1 | 10/2003 | Chiang et al. |

FOREIGN PATENT DOCUMENTS

| | | |
|---|---|---|
| EP | 0 838 910 | 4/1998 |
| EP | 0852430 | 7/1998 |
| EP | 0954122 | 11/1999 |
| EP | 1 065 825 | 1/2001 |
| JP | 06-132879 | 5/1994 |
| JP | H06-132879 | 5/1994 |
| JP | 08-163002 | 6/1996 |
| JP | 10-246769 | 9/1998 |
| JP | 11-285060 | 10/1999 |
| JP | H11-285060 | 10/1999 |
| KR | 2003-23856 | 3/2003 |
| TW | 378440 | 1/2000 |
| TW | 387186 | 4/2000 |
| TW | 391101 | 5/2000 |
| TW | 421941 | 2/2001 |
| TW | 432838 | 5/2001 |
| TW | 444448 | 7/2001 |
| TW | 444475 | 7/2001 |
| TW | 461199 | 10/2001 |
| WO | 94/28643 | 12/1994 |
| WO | 98/21897 | 5/1998 |
| WO | 98/57450 | 12/1998 |
| WO | 99/00912 | 1/1999 |
| WO | 99/19992 | 4/1999 |
| WO | 99/30519 | 6/1999 |
| WO | 99/33207 | 7/1999 |
| WO | 99/43099 | 8/1999 |
| WO | 99/44306 | 9/1999 |
| WO | 99/66754 | 12/1999 |
| WO | 00/04661 | 1/2000 |
| WO | 00/14907 | 3/2000 |
| WO | 00/31998 | 6/2000 |
| WO | 00/44117 | 7/2000 |
| WO | 01/01596 | 1/2001 |
| WO | 01/10160 | 2/2001 |
| WO | 01/41482 | 6/2001 |
| WO | 01/47220 | 6/2001 |
| WO | 01/80461 | 10/2001 |
| WO | 02/058334 | 7/2002 |

OTHER PUBLICATIONS

Siemens AG, "Proposed flexible signaling approach for 1.28 Mcps TDD NodeB sync," 3GPP TSG RAN WG1#23, R1-02-0004 (Jan. 8-11, 2002).

Third Generation Partnership Project, "Technical Specification Group Radio Access Network; UTRAN Overall Description (Release 1999)," 3GPP TS 25.401 V3.8.0 (Sep. 2001).

Third Generation Partnership Project, "Technical Specification Group Radio Access Network; UTRAN Overall Description (Release 1999)," 3GPP TS 25.401 V3.10.0 (Jun. 2001).

Third Generation Partnership Project, "Technical Specification Group Radio Access Network; UTRAN Overall Description (Release 4)," 3GPP TS 25.401 V4.2.0 (Sep. 2001).

Third Generation Partnership Project, "Technical Specification Group Radio Access Network; UTRAN Overall Description (Release 4)," 3GPP TS 25.401 V4.5.0 (Sep. 2002).

Third Generation Partnership Project, "Technical Specification Group Radio Access Network; UTRAN Overall Description (Release 5)," 3GPP TS 25.401 V5.1.0 (Sep. 2001).

Third Generation Partnership Project, "Technical Specification Group Radio Access Network; UTRAN Overall Description (Release 5)," 3GPP TS 25.401 V5.4.0 (Sep. 2002).

Third Generation Partnership Project, "Technical Specification Group Radio Access Network; Synchronisation in UTRAN Stage 2 (Release 5)," 3GPP TS 25.402 V5.1.0 (Jun. 2002).

Third Generation Partnership Project, "Technical Specification Group Radio Access Network; Synchronisation in UTRAN Stage 2 (Release 4)," 3GPP TS 25.402 V5.1.0 (Jun. 2002).

Third Generation Partnership Project, "Technical Specification Group Radio Access Network; Synchronisation in UTRAN Stage 2 (Release 1999)," 3GPP TS 25.402 V3.8.0 (Dec. 2001).

Third Generation Partnership Project, "Technical Specification Group Radio Access Network; Synchronisation in UTRAN Stage 2 (Release 1999)," 3GPP TS 25.402 V3.10.0 (Jun. 2002).

Third Generation Partnership Project, "Technical Specification Group Radio Access Network; Synchronisation in UTRAN Stage 2 (Release 4)," 3GPP TS 25.402 V4.3.0 (Dec. 2001).

TSG RAN WG1, "Reply to LS on support of flexible signaling approach for Node B synchronization for 1.28 Mcps TDD," TSG-RAN WG 3 Meeting #28, TSGR3#28(02)0909, (Apr. 8-12, 2002).

CATT/CWTS, "Updated TR for NodeB synchronization in 1.28Mcps TDD," TSG-RAN WG 1 Meeting #22, R1-01-1348 (Nov. 19-23, 2001).

Interdigital Communications Corporation, "Node Sync Tracking Simulation: Impact of TOA measurement accuracy," TSG-RAN Working Group 1 Meeting #12, R1(00)0469 (Apr. 10-13, 2000).

Interdigital Communications Corporation, "Proposed Clock Model for Node B Synchronization over the Air," TSG-RAN Working Group 1 Meeting #12, R1(00)0467 (Apr. 10-13, 2000).

Interdigital, "Draft—Reply LS On Suport Of Flexible Signaling Approach For Node B Synchronisation For 1.28 Mcps TDD", 3GPP TSG-RAN WG3 Meeting #26, R3-020271, (Voesendorf, Austria, Jan. 14-18, 2002).

Mitsubishi Electric, "Simulations and performance analysis for LCR-TDD Node B sync," TSG RAN Working Group 1 Meeting #23, R1-02-0059 (Jan. 8-11, 2002).

Mitsubishi Electric, "Node B synchronization for 1.28 Mcps TDD," 3GPP TSG RAN WG1#22, R1-01-1112 (Nov. 19-23, 2001).

Samsung, "One improved method of Node B Sync for 1.28Mcps TDD," 3GPP TSG RAN WG1#22, R1-01-1140 (Nov. 19-23, 2001).

Samsung, "Simulation results for Node B synchronization based on Extended SYNC_DL sequence in 1.28 Mcps TDD," 3GPP TSG-RAN WG1 Meeting #23, R1-02-0120 (Jan. 8-11, 2002).

Siemens AG (RAN1), "Draft LS on support of flexible signaling approach for Node B synchronization for 1.28Mcps TDD," 3GPP TSG RAN WG1 #23, R1-02-0006 (Jan. 8-11, 2002).

Siemens AG, "Centralized versus Distributed approach for NodeB sync for 1.28 Mcps TDD," 3GPP TSG RAN WG1 #23, R1-02-0005 (Jan. 8-11, 2002).

Siemens AG, "Comments on extended proposals for 1.28Mcps TDD NodeB sync," 3GPP TSG RAN WG1 #23, R1-02-0003 (Jan. 8-11, 2002).

Third Generation Partnership Project, "Technical Specification Group Radio Access Network; Synchronisation in UTRAN Stage 2 (Release 1999)," 3GPP TS 25.402 V3.10.0 (Jun. 2002).

Third Generation Partnership Project, "Technical Specification Group Radio Access Network; Synchronisation in UTRAN Stage 2 (Release 4)," 3GPP TS 25.402 V4.3.0 (Dec. 2001).

Higuchi et al., "Experimental Evaluation of 3-Step Cell Search Method in W-CDMA Mobile Radio," VTC 2000 IEEE, 0-7803-5718-3, pp. 303-307.

Nielsen et al., "WCDMA Initial Cell Search", VTC 2000-Fall, IEEE VTS 52$^{nd}$, Vehicular Technology Conference, vol. 1 of 6, Conf. 52, pp. 377-383, (Sep. 2000).

Nystrom et al., "Comparison of Cell Search Methods for Asynchronous Wideband CDMA Cellular System," International Conference on Universal Personal Communications, IEEE, vol. 2, pp. 783-787 (Oct. 5, 1998).

Third Generation Partnership Project, "Technical Specification Group Radio Access Network; UTRAN Overall Description (Release 5)," 3GPP TS 25.401 V5.1.0 (Sep. 2001).

Third Generation Partnership Project, "Technical Specification Group Radio Access Network; UTRAN Overall Description (Release 5)," 3GPP TS 25.401 V5.4.0 (Sep. 2002).

Third Generation Partnership Project, "Technical Specification Group Radio Access Network; Synchronisation in UTRAN Stage 2 (Release 5)," 3GPP TS 25.402 V5.1.0 (Jun. 2002).

Third Generation Partnership Project, "Technical Specification Group Radio Access Network; Synchronisation in UTRAN Stage 2 (Release 4)," 3GPP TS 25.402 V4.5.0 (Jun. 2002).

Third Generation Partnership Project, "Technical Specification Group Radio Access Network; Synchronisation in UTRAN Stage 2 (Release 1999)," 3GPP TS 25.402 V3.8.0 (Dec. 2001).

Third Generation Partnership Project, "Technical Specification Group Radio Access Network; Synchronisation in UTRAN Stage 2 (Release 1999)," 3GPP TS 25.402 V3.10.0 (Jun. 2002).

Third Generation Partnership Project, "Technical Specification Group Radio Access Network; Synchronisation in UTRAN Stage 2 (Release 4)," 3GPP TS 25.402 V4.3.0 (Dec. 2001).

Third Generation Partnership Project, "Technical Specification Group Radio Access Network; User Equipment (UE) procedures in idle mode and procedures for cell reselection in connected mode (Release 1999)," 3GPP TS 25.304 V3.9.0 (Dec. 2001).

Third Generation Partnership Project, "Technical Specification Group Radio Access Network; User Equipment (UE) procedures in idle mode and procedures for cell reselection in connected mode (Release 1999)," 3GPP TS 25.304 V3.11.0 (Jun. 2002).

Third Generation Partnership Project, "Technical Specification Group Radio Access Network; User Equipment (UE) procedures in idle mode and procedures for cell reselection in connected mode (Release 4)," 3GPP TS 25.304 V4.3.0 (Dec. 2001).

Third Generation Partnership Project, "Technical Specification Group Radio Access Network; User Equipment (UE) procedures in idle mode and procedures for cell reselection in connected mode (Release 4)," 3GPP TS 25.304 V4.5.0 (Jun. 2002).

Third Generation Partnership Project, "Technical Specification Group Radio Access Network; User Equipment (UE) procedures in idle mode and procedures for cell reselection in connected mode (Release 5)," 3GPP TS 25.304 V5.1.0 (Jun. 2002).

Third Generation Partnership Project, "Technical Specification Group Radio Access Network; Spreading and modulation (FDD) (Release 1999)," 3GPP TS 25.213 V3.7.0 (Dec. 2001).

Third Generation Partnership Project, "Technical Specification Group Radio Access Network; Spreading and modulation (FDD) (Release 1999)," 3GPP TS 25.213 V3.8.0 (Jun. 2002).

Third Generation Partnership Project, "Technical Specification Group Radio Access Network; Spreading and modulation (FDD) (Release 4)," 3GPP TS 25.213 V4.2.0 (Dec. 2001).

Third Generation Partnership Project, "Technical Specification Group Radio Access Network; Spreading and modulation (FDD) (Release 4)," 3GPP TS 25.213 V4.3.0 (Jun. 2002).

Third Generation Partnership Project, "Technical Specification Group Radio Access Network; Spreading and modulation (FDD) (Release 5)," 3GPP TS 25.213 V5.2.0 (Sep. 2002).

Third Generation Partnership Project, "Technical Specification Group Radio Access Network; Physical Channels and Mapping of Transport Channels onto Physical Channels (FDD) (Release 1999)," 3GPP TS 25.211 V3.9.0 (Dec. 2001).

Third Generation Partnership Project, "Technical Specification Group Radio Access Network; Physical Channels and Mapping of Transport Channels onto Physical Channels (FDD) (Release 1999)," 3GPP TS 25.211 V3.12.0 (Sep. 2002).

Third Generation Partnership Project, "Technical Specification Group Radio Access Network; Physical Channels and Mapping of Transport Channels onto Physical Channels (FDD) (Release 4)," 3GPP TS 25.211 V4.3.0 (Dec. 2001).

Third Generation Partnership Project, "Technical Specification Group Radio Access Network; Physical Channels and Mapping of Transport Channels onto Physical Channels (FDD) (Release 4)," 3GPP TS 25.211 V4.6.0 (Sep. 2002).

Third Generation Partnership Project, "Technical Specification Group Radio Access Network; Physical Channels and Mapping of Transport Channels onto Physical Channels (FDD) (Release 5)," 3GPP Ts 25.211 V5.2.0 (Sep. 2002).

TSG RAM WG1, "Reply to LS on support of flexible signaling approach for Node B synchronization for 1.28 Mcps TDD," TSG-RAN WG 3 Meeting #28, TSGR3#28(02)0909, (Apr. 8-12, 2002).

Universal Mobile Telecommunications System (UMTS); UMTS Terrestrial Radio Access (UTRA) Concept evaluation; (UMTS 30.06 version 3.0.0); TR 101 146 V3.0.0, pp. 47-49, (Dec. 1997).

Wang et al., "Cell Search in W-CDMA," IEEE Journal on Selected Areas in Communications, vol. 18, No. 8, pp. 1470-1482 (Aug. 2000).

* cited by examiner

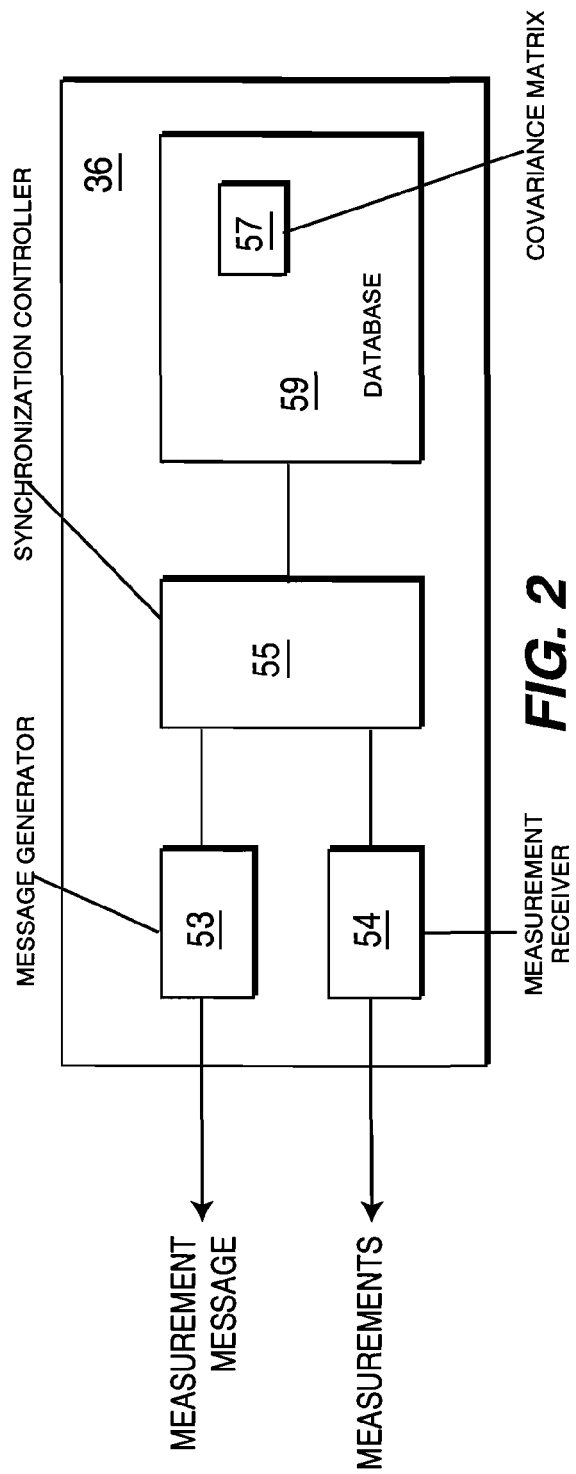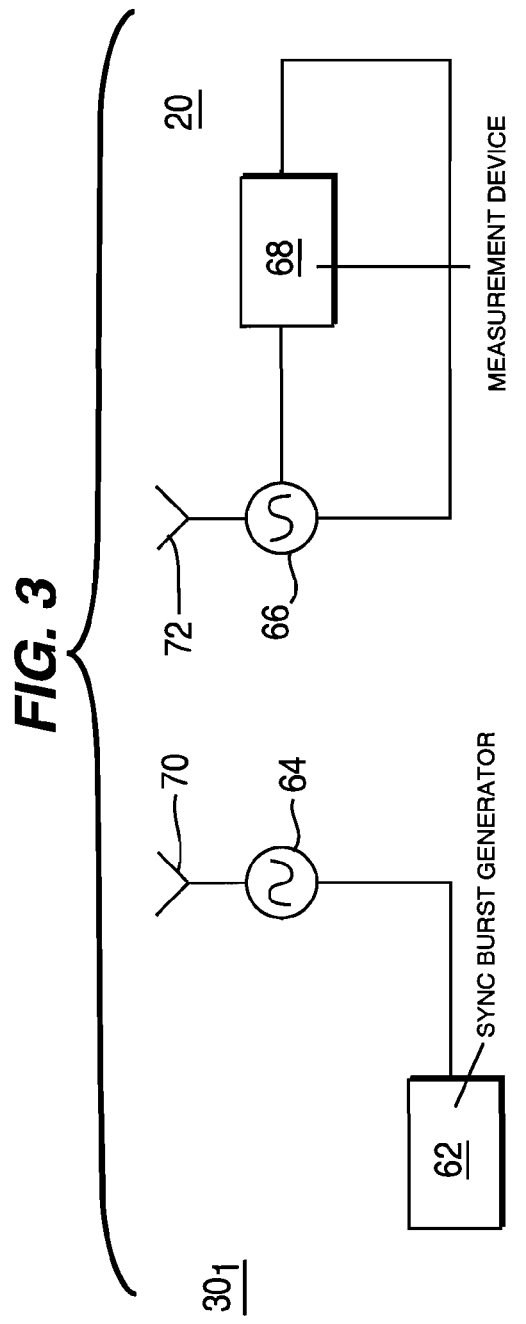

METHOD AND APPARATUS FOR SYNCHRONIZING BASE STATIONS

CROSS REFERENCE TO RELATED APPLICATIONS

This application claims priority from Application No. 60/355,739; filed on Feb. 5, 2002 which application is incorporated herein by reference.

BACKGROUND

The present invention relates generally to digital communication systems. More specifically, the invention relates to a system and method of synchronizing a plurality of base stations in a cellular communication network.

The proposed $3^{rd}$ generation (3G) wireless protocols require an approach that is based on a simple, but costly procedure of requiring each base station to be externally synchronized to a highly accurate external source. One technique which supports base station synchronization requires that a base station passively listen to synchronization transmissions from its neighbors on a channel, such as a synchronization channel (SCH) or a common control physical channel (CCPCH), and follow procedures similar to those performed by user equipment (UE) in order to synchronize. Another approach requires each base station to occasionally send a special synchronization burst in coordination with one or more of its neighbors listening for the transmission. Yet another approach has UEs measure the time difference of arrival (TDOA) of transmissions from each of two cells. These techniques utilize a precisely accurate source in every base station. Since each base station has this source, these techniques are costly and inconvenient.

Therefore, there exists a need for a system and method that allows fast, efficient, and less expensive synchronization between operational base stations without consuming additional physical resources.

There also exists a need for a system which provides accurate synchronization using a minimum number of interruptions of normal service, as well as reduced message traffic between the Node B and the radio network controller (RNC).

SUMMARY

Method and apparatus for synchronizing base stations employing an independent synchronizing source or identifying a base station as a master source. An RNC (C-RNC) or a base station may designate one base station or a UE to acquire measurements derived from base stations to achieve synchronization. Synchronization activities may be regularly scheduled or may be undertaken when periodic measurements indicate that a drift value exceeds a given threshold.

Objects and advantages of the system and method will become apparent to those skilled in the art after reading the detailed description of the preferred embodiment.

BRIEF DESCRIPTION OF THE DRAWINGS

The embodiments of the present invention will be described with reference to the drawing figures wherein like numerals represent like elements throughout and, wherein:

FIG. 2 is a block diagram of a radio network controller (RNC) made in accordance with a preferred embodiment of the present invention.

FIG. 3 is a block diagram of a base station and UE made in accordance with 6a preferred embodiment of the present invention.

DETAILED DESCRIPTION OF THE PREFERRED EMBODIMENTS

Figure 1:
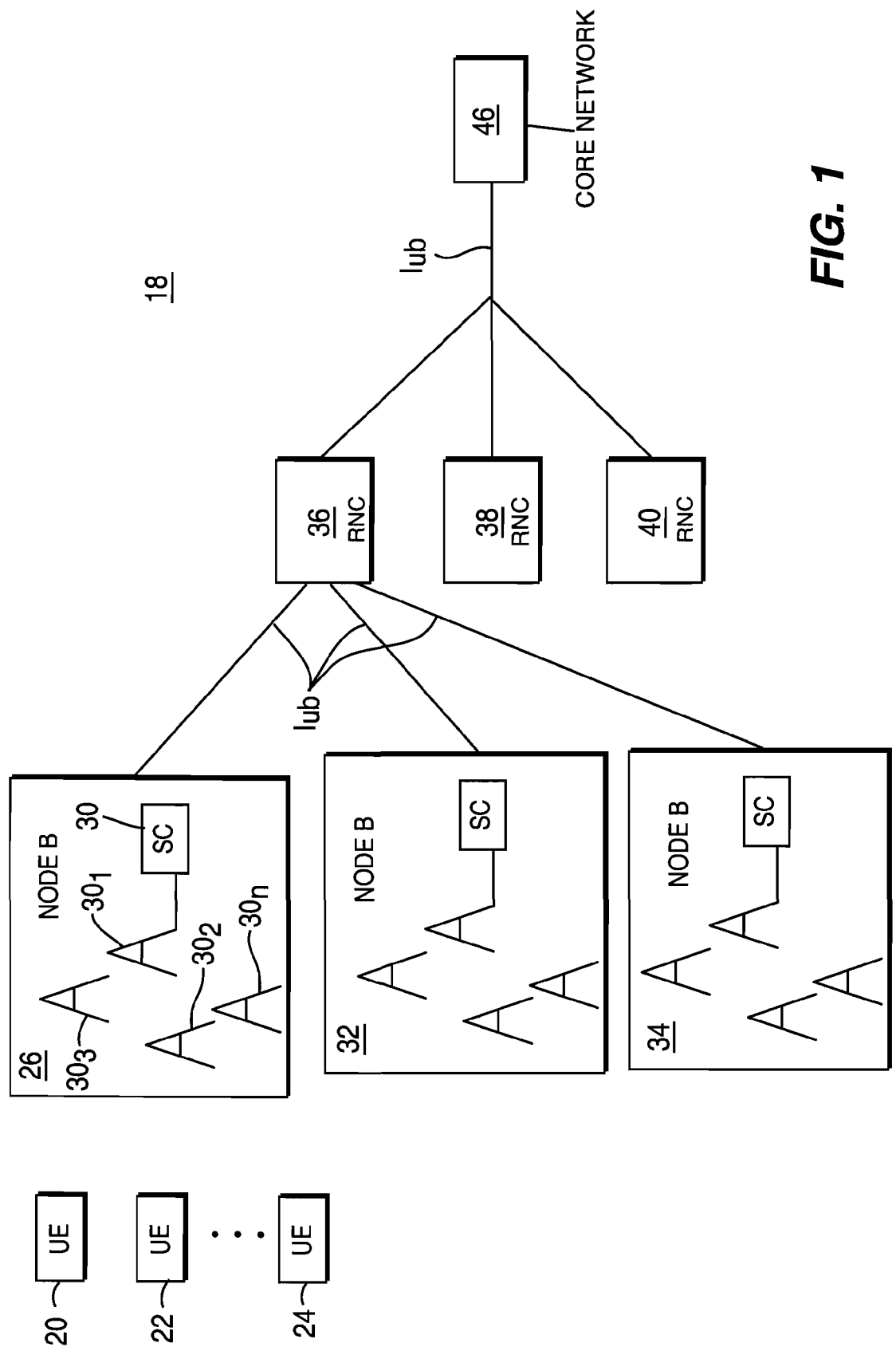
FIG. 1 is a block diagram of a communication system.

FIG. 1 illustrates a simplified wireless spread spectrum code division multiple access (CDMA) or time division duplex (TDD) communication system 18. The system 18 comprises a plurality of Node Bs 26, 32, . . . 34, a plurality of RNCs, 36, 38, . . . 40, a plurality of user equipments (UEs) 20, 22, 24 and a core network 46. A Node B 26 within the system 18 communicates with associated user equipment 20-24 (UE). The Node B 26 has a single site controller (SC) 30 associated with either a single base station 30', or multiple base stations $30_1 \ldots 30_n$. Each base station services an associated geographic region known as a cell. It should be noted that even though base station synchronization is disclosed, cell synchronization may also be accomplished using the present invention.

A Group of Node Bs 26, 32, 34 is connected to a radio network controller (RNC) 36 by the Iub interface. The RNCs 36 . . . 40 are also connected to the core network 46 through the Iub interface. For brevity, the following refers to only one Node B, but the present invention can be readily applied to multiple Node Bs.

There are two basic ways the Node B Synchronization can be managed—a centralized approach or a decentralized approach. In the centralized approach, all of the sub-functions of cell measurement and cell time base correction are performed at the request of the controlling RNC (CRNC) and measurements are reported to the RNC. In the decentralized approach some or all of the Node B functionality is done without direct instructions from the RNC. There are also different degrees of centralization. For example, the preferred approach is almost completely centralized, but does allow for a limited autonomous functionality; e.g. as discussed below, the Node B may autonomously adjust its internal frequency source, based on observed trends in its time base corrections signaled by the RNC.

An example of a decentralized approach involves the RNC 36 telling each of the cells in Node Bs 26, 32, 34 which neighbor cells are used for synchronization and then the RNC allows each of said cells to adjust its clock autonomously without explicit notification of the time change to the RNC. In this technique the cells have to maintain an accurate clock and, since all cells are adjusting based on each other, overall system stability cannot be guaranteed. This decentralized approach has been proposed, but is not the preferred approach.

In accordance with a preferred technique, the RNC 36 maintains overall base station synchronization within and between the Node Bs 26, 32, 34. Referring to FIG. 2, the RNC 36 includes a database 59 having a covariance matrix 57, a synchronization controller 55, a message generator 53 and a measurement receiver 54. The RNC 36 may request measurements from a base station $30_1 \ldots 30_n$ or UE 20, 22, 24 through its message generator 53; receive measurements through its measurement receiver 54; optimally update its estimates of states based on these measurements using the synchronization controller 55; and manage a set of states stored in a covariance matrix 57. The stored states are used for synchronization and represent the time error of each base station 30 relative to a reference, the rate of change of each time error and the transmission delay between base stations 30, ... 30n.

The RNC 36 also manages a set of measurements stored in a database 59 comprising: time of arrival of a measured waveform (i.e. sync burst); TDOA of transmissions from two base stations as measured by a UE 20; and estimates of state uncertainties and measurement uncertainties. The database 59 further contains the estimate for all states of interest, e.g. for all cells (Node B) other than the master, time offset or error (in nanoseconds, or microseconds; typical value in the range of +/−3 microseconds to +/−3000 nanoseconds); time rate of change of time offset, e.g. nanoseconds of drift per second or microseconds of drift per second. The state vector is the ordered set of all states, e.g.

$$\Delta t(1), \Delta t(2), \ldots, \Delta t(n-1), \frac{d}{dt}(\Delta t(1)),$$
$$\frac{d}{dt}(\Delta t(2)), \ldots, \frac{d}{dt}(\Delta t(n-1)),$$

where there are n Node Bs, including the master, Node B(0), denoting the state vector X=x(1),x(2), ... x(m) where $$m = 2(n-1) = \Delta t(1), \frac{d}{dt}(\Delta t(1)), \Delta t(2), \frac{d}{dt}(\Delta t(2)), \ldots,$$
$$\Delta t(n-1), \frac{d}{dt}(\Delta t(n-1)),$$

the covariance matrix is the m x m matrix where R(I,J)=E((x(i)x(j))=expected value of the product of the i and j elements. The RNC 36 uses advanced filtering, such as Kalman filters, to estimate parameters that define relative clock drift, and to refine parameters such as exact range between one element and another. The estimated time drift is used to infer the frequency mismatch between the frequency references of the respective base stations and reasonableness checks to ensure that occasional, grossly inaccurate measurements do not corrupt the process. The Kalman Filter also estimates the uncertainty of the various states. These values are stored in the covariance matrix. It should be noted that the diagonal elements of the covariance matrix represent the variance of each individual state.

The preferred embodiment uses a hierarchical process in which the RNC 36 assigns a time quality to each base station $30_1 \ldots 30_n$. This time quality is measured by the RNC 36 by selecting one base station as the time base reference for all others. All other base stations are assigned a variable time quality that is updated based on measurements and applied corrections. The time quality may be an integer (e.g., 0 to 10). A lower quality value implies a better accuracy. As an alternative, the quality value may be a continuous (floating point) variable. The reference base station (master base station) is preferably assigned a quality value of 0. All other remaining base stations are assigned values which vary and are adjusted with respect to the reference base station. To illustrate this time quality hierarchical design, FIG. 4 displays a master base station wherein all slave base stations (slave 1, slave 2, slave 3) are assigned time quality values which vary with respect to the master base station. In one embodiment, the time quality of slave 2 base stations are assigned values which vary with respect to the slave 1 base stations and slave 3 base stations are assigned values which vary with respect to slave 2 base stations.

An alternative embodiment to a full hierarchical master/slave architecture is a peer-to-peer one, requiring each pair of base stations that can hear each other move its own frequency closer to that of the other. The relative amount of adjustment is defined by a set of unique weights assigned to each base station and stored in the RNC database 59. The process of adjusting each of the base stations is the same as disclosed in the preferred embodiment set forth above except that both the "in sync" and "out-of-sync" base stations are adjusted based on the weights assigned to the respective base stations. With different weights, one can achieve varying degrees of centrality, between the fully central to the fully distributed. However in many environments this type of peer-to-peer clock updating cannot guarantee that a continuous clock drift of the pair of base stations from other pairs of base stations.

In the true hierarchical clock structure, RNC 36, in the normal mode of operation, updates covariance matrix 57 for the states stored in the RNC database 59, once per a predetermined time unit, (e.g. once per five seconds or a time determined by an operator). The diagonal elements of the covariance matrix 57 are the estimated variance of each base station's time error with respect to the master base station.

When a base station's time error variance exceeds a predetermined threshold, the RNC 36 initiates a message to support that base station's time error update. The update is performed in one of three ways: first, the subject base station is instructed to measure the base station time of arrival (BSTOA) of a sync burst from a neighboring base station $30_1$ $30_2 \ldots 30_n$; second, a neighbor base station $30_1, 30_2 \ldots 30_n$ with better quality is instructed to measure BSTOA of the subject base station's transmission; or third, a UE 20 measures the BSTOA of sync bursts of that base station and a neighboring base station $30_1, 30_2 \ldots 30_n$.

In the first and second approaches using base station to base station BSTOA, the time of arrival of one base station transmission to another is observed. Referring to FIG. 3, a transmitting base station $30_1$ sends a known transmission pattern at a predefined time. This transmission pattern may be a sync burst from the sync burst generator 62 of the base station $30_1$, which passes through an isolator 64 prior to being radiated by an antenna 70. The receiving base station $20_1$ detects the transmitted waveform, passes it through an isolator 66 to measurement device 68 which outputs a large value when the received signal coincides with the expected signature which output is then transmitted. If the receiving and transmitting base stations 20, 30, were at the same location and had precisely synchronized clocks, the output of the measurement device 68 would occur at the same time as the transmitted waveform. However, clock misalignment and transmission path delay causes a time difference.

Transmission path delay is defined as per Equation 1:

$$R/c+x \qquad \text{Equation 1}$$

where R/c is the distance R between a transmitting unit and receiving unit divided by the speed of light c. The term x accounts for equipment delays. When base stations are very far apart the quantity R/c typically dominates. Radio waves travel at the speed of light, approximately 1 foot per nanosecond, or $3\times10^8$ meters per second. The objective of base station synchronization is to align the base stations to within 1-3 microseconds. Therefore, when base stations are separated by distances on the order of ½ mile (1 km) or more, these distances have a significant effect on delay. However, for pico or micro cells, separated by tens of meters, the distances are insignificant compared to the measurement accuracies, x, which dominates.

Based on these considerations, when attempting to synchronize base stations far apart (more than 1 km) the knowledge of the amount of separation (i.e. the distance) is important. When attempting to synchronize base stations within 50 meters or so, the exact positions become irrelevant. After the measurement of BSTOA is performed, the known propagation distance stored in the RNC database 59 is subtracted and the difference is considered the misalignment in time between the base stations.

The third approach measures the relative time difference of arrival (TDOA) between two transmissions sent by two different base stations as observed by a UE 20. The UE 20 measures and reports the observed TDOA between transmissions from two base stations. The RNC 36 sends a message to the UE 20 to measure the TDOA of two base stations. Upon receipt of this message, the UE 20 receives the transmission of the two base stations, via its antenna 72 and isolator 66, and measures the TDOA using the UE measure receive device 68 and transmits the measurements to its associated base station through isolator 66 and antenna 72.

If the UE position is known (i.e. its range to each of the two base stations r1 and r2 is known) and the timing of both base stations is correct, the TDOA is, as per Equation 2:

$$(r1-r2)/c \qquad \text{Equation 2}$$

Measured deviations from this value would be an indicator of time base misalignment. As those skilled in the art know, if the ranges r1 and r2 are sufficiently small as would be true for pico-sized cells, it would not be necessary to know their values. Observed TDOA could be used directly as a measure of time difference of transmission.

Once an approach is chosen, the appropriate message is transmitted to either a base station $30_1 \ldots 30_n$ or a UE 22, 24, 20. If the message is sent to a base station $30_1, \ldots 30_n$, such as base station $30_2$, the base station $30_2$ is told which neighbor to monitor and measure. If the message is to a UE 22, the UE 22 is directed which other base station to measure in addition to its own base station.

Referring back to FIG. 2, once the RNC 36 has stored the range between each base station $30_1 \ldots 30_n$ within its database 59, it subsequently checks to see if there is a neighboring base station $30_1$ which has a better time quality than the base station $30_2$ to be updated. Once such a neighbor base station $30_1$ is found, a message is initiated to the neighboring base station $30_1$ to take a measurement from the "out-of-sync" base station $30_2$. Alternatively, the RNC 36 is able to send a message to the "out-of-sync" base station $30_2$ and request that it take a measurement of the neighboring base station $30_1$. The requested base station, for purposes of this embodiment, the "out-of-sync" base station $30_2$, then takes the measurement of the "in-sync" base station $30_1$ and sends the measured value back to the RNC measurement receiver 54. The RNC measurement receiver 54 forwards the measured value to the synchronization controller 55 which computes the time of transmission of the measurement by subtracting the propagation time r/c.

Once the time of transmission is calculated by the RNC synchronization controller 55, the value is compared to the value stored in the RNC database 59. The RNC synchronization controller 55 then computes Kalman filter gains and updates the states in the covariance matrix 57 using the difference between the calculated and predetermined time of arrival and the common gains. If the difference is beyond a certain threshold, the RNC message generator 53 will then send another message to the "out-of-sync" base station $30_2$ to adjust its time base or its reference frequency in order to get "in sync" with the other base station $30_3 \ldots 30_n$ under the control of the RNC 36. Note the following two issues:

(1) In a preferred embodiment, the RNC can send a message to the Node B to adjust its frequency; however, it may be (as is the case in the Third Generation Partnership Project, (3GPP) RAN specification) such a message may not exist, and therefore this feature cannot be used.

(2) In this concept, the estimated time error may exceed a threshold and trigger a time base correction without the need for new measurements, i.e. with a highly reliable estimate of the drift rate, the RNC may correctly identify that a Node B is exceeding its allowed time offset simply by extrapolating the time error, using the estimated drift rate.

The base station $30_2$ conducts the requested adjustment and reports it back to the RNC measurement device 54. The database within the RNC 36 is updated, including a correction to the subject base station's $30_2$ time reference, its time rate of change (which is not applicable if there has not been a frequency adjustment), an update of its covariance matrix 57 (including, most significantly, its estimated RMS time error and drift error), and an update to its time quality.

Figure 4:
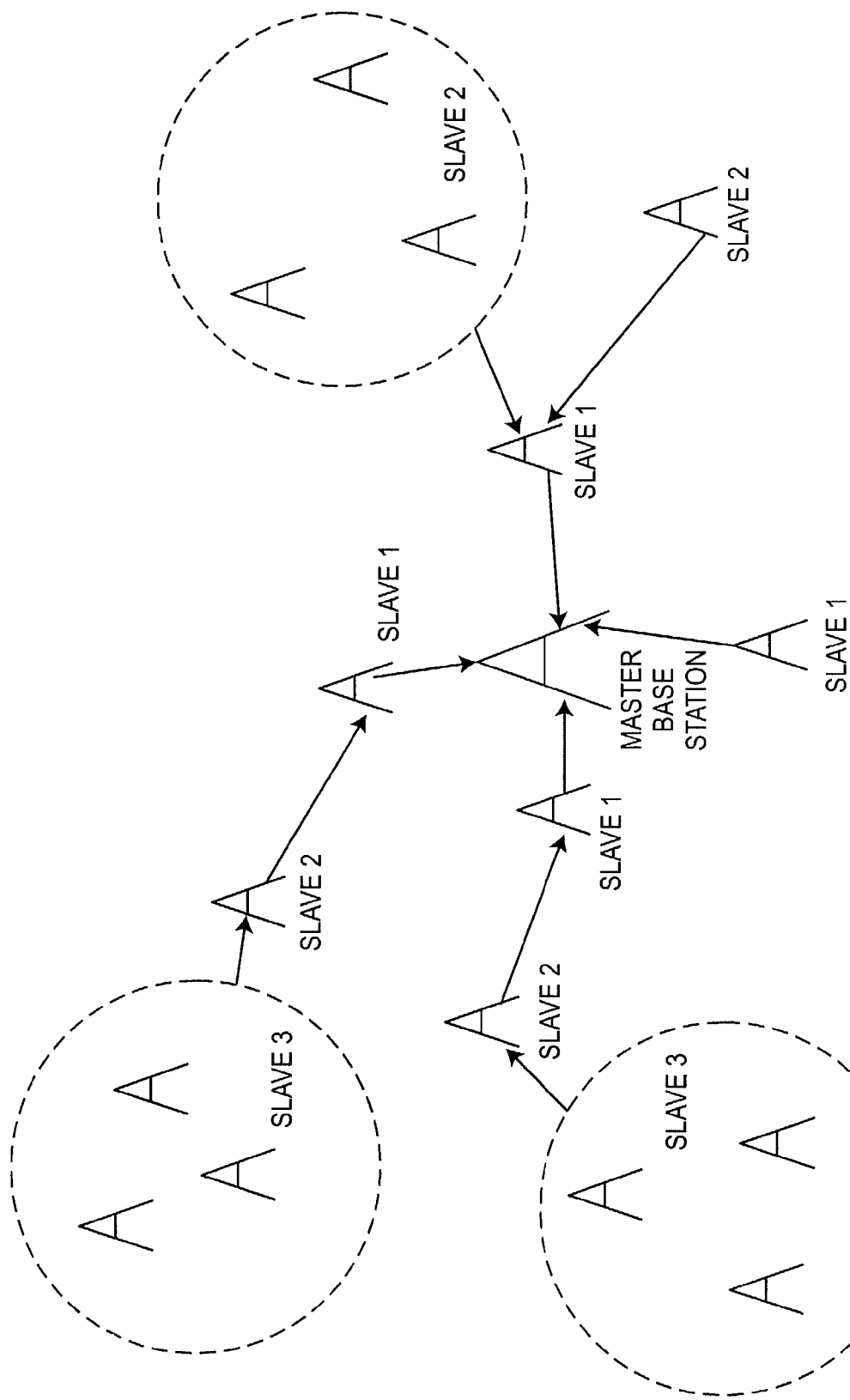
FIG. 4 is an illustration of the hierarchal time quality design made in accordance with a preferred embodiment of the present invention.

Referring to FIG. 4, a base station whose time base is corrected based on a comparison to another base station, is never assigned a quality equal to or better than that of a base station to which it is a slave. This procedure guarantees stability. To illustrate, if a slave 2 base station is to be corrected, the slave 2 base station can only be assigned a value worse than that of time quality of its slave 1 base station. This ensures that the time quality of a base station will not synchronize to a slave base station of the same time quality level or less, which could eventually lead to a cluster of base stations drifting "out-of-sync" with the master base station.

As disclosed hereinbefore, an alternative approach for taking measurements in order to adjust the "out-of-sync" base station $30_2$ uses a UE 20, 22, 24. If this method is chosen by the RNC 36, a message is sent to the UE 22 to measure the sync burst of the "out-of-sync" base station $30_2$ and the "in sync" base station $30_1$. Once the measurements are taken by the UE 22, the measurements are sent to the RNC 36 and processed. Similar to the methods described above, the measurements are compared to the known measurements stored in the RNC database 56 and covariance matrix 57 and an adjustment measurement sent to the "out-of-sync" base station $30_2$.

Figure 5A:
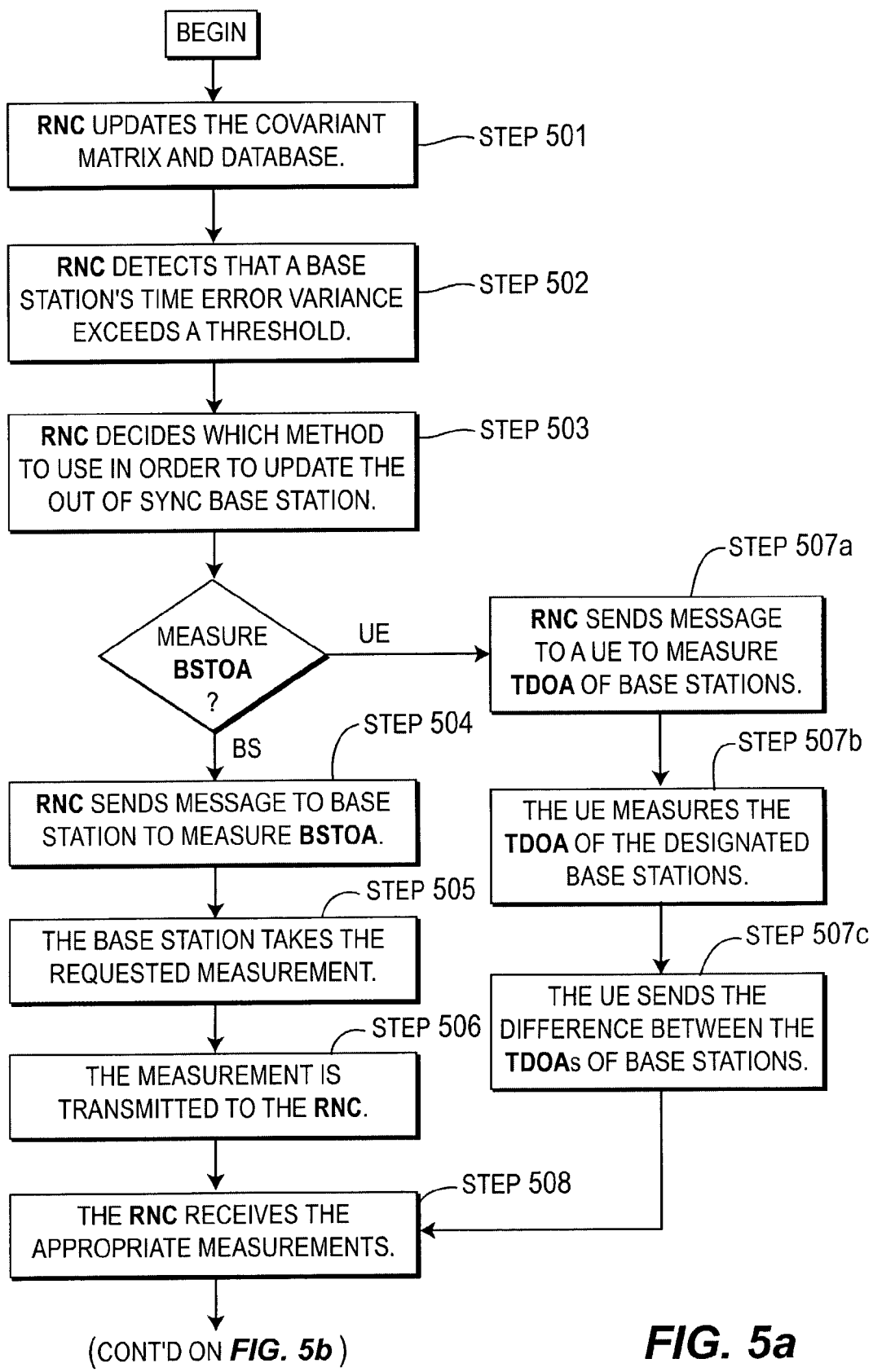
FIGS. 5a and 5b, taken together, comprise a flow diagram of the system in accordance with a preferred embodiment of the present invention.
Figure 5B:
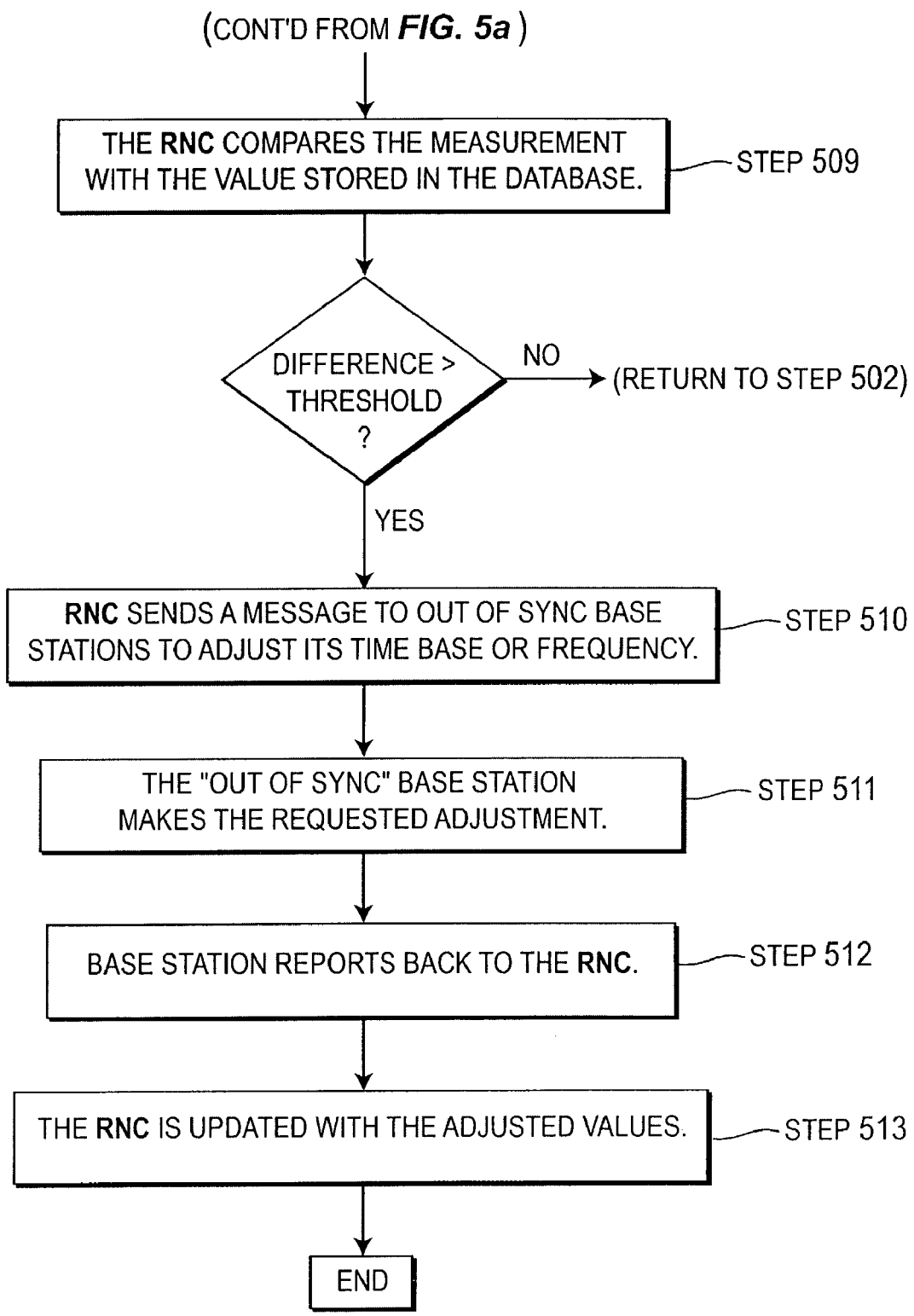

A flow diagram of a method in accordance with the preferred embodiment is illustrated in FIGS. 5a and 5b. The RNC 36 updates the covariant matrix 57 and database 59 once per unit time (step 501). When the RNC 36 detects that a base station's $30_2 \ldots 30_n$ time error variance exceeds a predetermined threshold (step 502), the RNC 36 decides whether to use a base station (BS) to measure BSTOA or a UE to measure TDOA in order to update the "out-of-sync" base station's time error variance (step 503). If the RNC 36 decides to measure BSTOA, a message is sent to a neighboring base station of the "out-of-sync" base station to measure the base station time of arrival (BSTOA), or the message is sent to the "out-of-sync" base station to measure the time of arrival of the neighboring base station (step 504). The appropriate base station takes the requested measurement (step 505) and transmits the measurement to the RNC 36 (step 506).

If the RNC 36 decides to measure TDOA, the RNC 36 sends a message to a UE to measure the TDOA of two base stations (step 507a), one being the "out-of-sync" base station.

The UE measures the TDOA of each base station (step 507*b*) and sends the difference of these measurements to the RNC 36 (step 507*c*).

Upon receipt by the RNC 36 of the appropriate measurements (step 508), the RNC 36 compares the measurement to the value stored in the RNC database 59 (step 509). If the difference is beyond a certain threshold, the RNC 36 sends a message to the "out-of-sync" base station to adjust its time base or its reference frequency (step 510) in accordance with this difference. The "out-of-sync" base station conducts the requested adjustment (step 511) and reports it back to the RNC 36 (step 512). The RNC database 59 and covariance matrix 57 are then updated to incorporate the new values (step 513).

A preferred embodiment is a system and method that resides in each RNC 36. In the prior art, a controlling radio network controller (C-RNC) communicates directly with its base stations and a serving radio network controller (S-RNC) communicates directly with its UEs. For cases where neighboring base stations are under control of different RNCs, there may be a need to add communication between the C-RNCs and S-RNCs that control the neighboring base stations and UEs.

Instead of an architecture that depends upon complete centralized control, an alternative embodiment may rely upon a more distributed update structure. In this embodiment each member of a pair of base stations that can hear each other is able to move its own frequency closer to that of the other. The relative amount of adjustment is defined by a set of unique weights which are assigned to each base station and stored in the RNC database 59. The process of adjusting each of the base stations is the same as disclosed in the preferred embodiment hereinbefore except that both the "in sync" and "out-of-sync" base stations are adjusted based on the weights assigned to the respective base stations. With different weights, one can achieve varying degrees of centrality, between the fully central to the fully distributed.

In either the centralized or decentralized approach the manner in which multiple cells within a single Node B are kept "in sync" has many possibilities. The most preferred embodiment enables an RNC 36 to send time corrections and/or frequency corrections to a base station $30_1 \ldots 30_n$. The master base station is responsible to ensure that each of its base stations within a single Node B have a time reference slaved to it, accurate within a specified limit. The RNC 36, in its algorithms and corrections, assumes that there is negligible error existing between the master base station and its base stations and therefore assumes that all base stations have the same time reference.

As a consequence, the RNC 36 does not attempt to estimate the individual time errors between the master base station and its slave base stations, and the master base station must eliminate or compensate for timing errors between the master base station and each of the other base stations, since the associated RNC 36 does not perform a correction. This embodiment presents a clean interface between an RNC 36 and a master base station. It enables the master base station to apply its own solution to slave synchronization which is well suited to pico-cells. This method also reduces the amount of over-the-air synchronization that is necessary since only one cell of a Node B needs to be measured to know the current time and frequency reference for all of the cells within the Node B. However this is a larger effort in the hardware of the Node B since the clock reference must be transported between the Node B site controller (SC) and the cells and if the distance between the SC and a cell is large, timing error based solely on distance makes this impractical.

In a first alternative embodiment, called "Cell Master Frequency and Time Reference" each base station has an independent time and frequency reference which enables an RNC 36 to send time corrections and/or frequency corrections to each base station. The RNC 36, in its algorithms and corrections, estimates the states which represent the time and frequency error of each base station. As a consequence, the RNC 36 attempts to estimate the individual time errors between each base station, and the master base station, measurements involving one base station provide no benefit to estimating the states of another base station. Therefore, the base station manufacturer need only provide loosely bounded errors in the timing and time drift of the base stations, and every base station must have an acceptable connectivity over the air to another base station (same or different base station).

This alternative embodiment benefits large cellular areas where the distance between base stations are far. The ability to correct one base station slaved to the time reference of a Node B through measurements involving another base station slaved to the same Node B is limited.

In a second alternative embodiment called "SC Master Frequency Reference/Cell Master Time Reference" each base station uses independent time references but the master base station provides a frequency reference. An RNC 36 sends time corrections for each base station individually and/or a single frequency correction to a master base station. The RNC 36 ensures that the clock of each base station is slaved in frequency to the clock of the master base station. The RNC 36, in its algorithms and corrections, assumes that there is negligible drift error between the master base station and its assigned base stations, but estimates offsets which are treated as constant. The RNC 36 estimates the individual time errors between the master base station and its base stations and the common frequency drift of the base stations with regard to the master base station.

A third alternative embodiment has features similar to those of the "SC Master Frequency and Time Reference" embodiment but where base stations that are far from the master base station benefit. This embodiment provides a mechanism to remove time mismatches in long distances. Taking advantage of the assumption that these time offsets are stable, this embodiment takes advantage of a measurement involving any base station slaved frequency to the clock of the master base station, to update the drift rate for all base stations slaved to the same master base station.

In a fourth alternative embodiment, called "Assisted SC Master Frequency and Clock Reference" the RNC 36 provides estimates to the master base station to support its synchronization of the base stations slaved to it. An RNC 36 sends time corrections and/or frequency corrections for each associated base station to its respective master base station. The master base station ensures that its associated base stations each have a time reference slaved to itself, accurate within a specified limit. The master base station may elect to use the base station-unique estimates to aid in the base station synchronization. The RNC 36, in its algorithms and corrections, creates a best estimate of the time and frequency error between the master base station and its base stations. In performing state estimates it weighs the relative confidence between the measurements and the base station error uncertainty. As a consequence, the RNC 36 attempts to estimate the individual time errors between the master base station and its base stations, and the master base station eliminates and/or compensates for timing errors between the master base station and each base station slaved to its time reference, or requests assistance from the RNC 36. This embodiment allows for a structure like the "SC master frequency and time reference" embodiment but allows for adjustments due to a less accurate passing of the master references, relaxing some of the limitations of that embodiment.

In all timing models, the network is correctly synchronized using a minimum number of interruptions of normal service. This reduces the amount of blanking in the air interface and reduces the number of messages going over the IUB interface, resulting in the reduction of the amount of overhead required to support the Node B synchronization as disclosed above.

In high chip rate (HCR) TDD and low chip rate (LCR) TDD systems, the use of blanking signals is required in order for any Node B to make the measurements required by the RNC. HCR TDD systems blank in advance using a prescheduled and usually only require that the Node B transmit, (for purposes of measuring it's TOA by another Node B), a blank signal so that a measurement can be made. LCR TDD systems require that the transmitting Node B, as well as some of it's neighboring cells, blank to avoid the interference caused by these neighboring cells on the received signal by the measuring Node B. As those skilled in the art know, the use of too many blanking signals in the system interferes with the normal operation of the system, resulting in degradation.

As disclosed above, the Node B synchronization procedure in accordance with the present invention, (either centralized or decentralized), involves the same basic functions (and sub-functions):

1) cell measurement is made
   a. the cell sending the burst is instructed to send the burst.
   b. the cell(s) in vicinity of the sending cell are told to blank their downlink physical synchronization channel (DwPCH) and make a measurement
   c. the measurement is reported as necessary.
2) a cell adjustment in the timing of one or more cells is made.

It should be noted that functions 1 and 2 can be asynchronous. There can be multiple cell measurements made without a cell adjustment and there can be multiple cell adjustments for a single cell measurement.

In the centralized approach all of the sub-functions of cell measurement are done in the same scheduling message and the cell adjustment is requested by the controlling RNC (CRNC). In the decentralized approach each of the sub-functions of cell measurement involves a separate message and the Node B can now do the cell adjustment procedure autonomously.

If the physical random access channel (PRACH) burst is substituted for DwPCH in the functions above, the above applies equally to HCR TDD Node B synchronization, with the difference being that in the case of the use of the uplink PRACH burst, all of the UEs in the cell must be made aware of the schedule so that the uplink PRACH timeslot can be blanked out when it is needed for synchronization.

These messages all require use of the Iub and their traffic load can be a factor.

However, messages instructing a Node B to correct its time base impact the Iub, but not the air interface resources. The decentralized approach with separate messages, but without a schedule, will lead to more messages over the Iub but they are shorter messages. However Iub load switching involves more than message size, so the number of messages is a factor in Iub load.

In order to eliminate the amount of blanking that occurs on the system, due to the need for Node Bs to make measurements to insure continuous synchronization, the fifth alternative embodiment uses the RNC's ability to track each Node B's long term drift, with respect to a defined reference. As disclosed above, the RNC may send messages to the Node B to make a measurement, to blank a transmission, or to make a correction to its time base. These messages may be sent according to a predefined schedule, e.g. periodically (hourly, per second, etc . . . ). The use of the long term drift rates of each Node B reduces the necessary periodicity of making measurements. If short term drift were not a factor, the RNC would be able to maintain synchronization in steady state with a very low rate of measurement requests. Accordingly, the rate of measurement requests would be directly related to the long term drift rate.

For example, if Node B (A) had a long term drift rate of X minutes per day, the RNC could make measurement requests of the Node B (A) relative to the amount of time it takes for the Node B (A) to drift from some time reference more than 3 microseconds, the maximum deviation in frame start times between any pair of cells, for example. The amount of time depends solely on the long term drift rate. Therefore, the periodicy of the measurement request would equal the amount of time it takes for the Node B(A) to drift 3 microseconds.

It is only necessary for a given Node B to be able to measure the TOA of one other Node B's transmission. As stated above, either one of the two Node B's may be judged to have the more accurate time base. The RNC may select either one of the two Node B's to instruct a correction. In the simplest example, the designated time reference measures TOA from another Node B (i.e. slave). The RNC uses this measurement to improve its estimate of the slave's time error and drift.

Since short term drift (stability) is a factor, the rate of measurements is driven by the short term stability as opposed to the long term stability. In reality, the RNC may derive a very accurate estimate of a given Node B's long term drift rate, based on past history, but that drift rate may change, therefore requiring new measurements. These new measurements are taken when the time rate of growth of uncertainty exceeds a predetermined threshold. The value of this time rate of growth of uncertainty (maximum allowable error) can be derived from any of the measurements stored in the RNC. Methods of determining this rate using the stored measurements are known in the art. The frequency of correction messages on the Iub will be proportional to the long term drift rate and inversely proportional to the maximum allowable error, which will be higher that the frequency of over-the-air measurements.

The current set of messages proposed for Node B sync from the RNC to the Node B include the capability for the RNC to tell the Node B to blank a transmission, make a synchronization transmission, perform a measurement, or make a time base correction. Another message that is proposed commands a Node B to make a set of N measurements, take an average and then, either report this average value to the RNC or make a correction. These instructions may be via a periodic schedule or as a single event. These new messages help reduce Iub traffic, but they will not reduce the need for blanking to support measurements.

Several other approaches to reduce the Iub message rate include:

1) provide a new message that instructs a Node B to modify its clock rate by n1 ppm; n1 being a predetermined number.
2) providing a new message that instructs a Node B to modify its frequency reference (which drives the clock) by n1 ppm.
3) provide a parameter to the already existing cell adjustment message that instructs a Node B to increment (or decrement) its clock by n1 chips per n2 frames, by adding number of frames to repeat the adjustment.

4) impose a requirement on the Node B to derive its drift rate from its time corrections from the RNC and to autonomously adjust its clock.

Approaches 1 and 2 require the RNC to send an additional message within the existing cell adjustment message that indicates to the Node B to adjust its clock rate or frequency rate a certain amount. This message is sent at some periodic time, depending on the long term drift rate of the Node B. For example, if the RNC determines that the Node B's clock rate should be adjusted once every ten (10) microseconds, the message is sent once every ten (10) microseconds, which indicates the amount of the adjustment.

Approach 3 requires the RNC to send a single message to the Node B indicating how often (adjustment rate) to update its clock rate, which is dependent on the estimated long term drift rate calculated by the RNC using the measurements stored therein. Since the RNC can calculate the long term drift rate, it can, with a single message, adjust the Node Bs long term rate continuously without Iub traffic, thereafter the RNC would have to take only short term drift into account along with possible changes in the long term rate, it does not have to make the same correction repeatedly over time. This message is only sent one time. The Node B continues to update its clock rate or frequency reference at the received adjustment rate until the RNC determines that the maximum allowable error has been reached and requests a measurement from the Node B which adjusts its estimated long term drift rate.

Approach 3 is also the simplest and can be implemented with a minor addition of functionality to the timing adjustment message. Furthermore, this allows the RNC to be aware of the Node B behavior (a weakness of the de-centralized approach).

Two options for the management of measurements disclosed hereinabove:
☐RNC requests measurement when its estimated uncertainty (based on tracking techniques) exceeds a threshold;
☐RNC can simply schedule in advance a measurement schedule, assumed a priori, to be sufficient.

The first option optimally reduces the impact on air-interface by scheduling measurements, only when needed, but adds Iub traffic. The second option reduces Iub traffic. The RNC can adjust for (historically determined) differences in individual Node B drift characteristics by assigning different measurement update rates as appropriate. Either of these two options is an order of magnitude less demanding on the air interface and the Iub than the current LCR Node B candidate approaches, and either option can be implemented with the existing message set.

Approach 3 is not required, but would provide additional reductions in Iub traffic. It can be achieved for LCR TDD by adding a simple modification to the Cell Synchronization adjustment message.

Approach 4 moves some of the tracking algorithms in the RNC and incorporates them in the Node B. The Node B derives its drift rate from the time corrections from the RNC and determines an adjustment rate based on its drift rate. The Node B adjusts its clock in accordance with the determined adjustment rate.

While the present invention has been described in terms of the preferred embodiments, other variations which are within the scope of the invention as outlined in the claims below will be apparent to those skilled in the art.

What is claimed is:

1. A method for time synchronizing a plurality of base stations in a wireless communication system, comprising:

detecting at least one of a plurality of out-of-sync base stations;

measuring a plurality of cell timing signals, wherein the measuring includes sending a request for a base station time of arrival (BSTOA) value to at least one of the out-of-sync base stations, and transmitting the BSTOA value;

correcting the at least one of a plurality of out-of-sync base stations, wherein the correcting includes:
  comparing the BSTOA value with a stored BSTOA value;
  generating a correction message;
  transmitting the correction message to the out-of-sync base station;
  receiving a report from the out-of-sync base station; and
  updating a covariant matrix database;

maintaining the covariant matrix database on a radio network controller (RNC);

wherein at least one out-of-sync base station or at least one user equipment (UE) is under control of at least two different RNCs, and:

establishing a communications path between the at least two different RNCs; and performing base station synchronizing.

2. The method of claim 1 wherein detecting at least one of a plurality of out-of-sync base stations comprises:
updating a covariant matrix database; and
determining at least one out-of-sync base station from the plurality of cell timing signals.

3. The method of claim 1 wherein measuring a plurality of cell timing signals further comprises:
sending a request for the BSTOA value to at least one of a plurality of user equipments (UEs) to measure the out-of-sync base stations; and
transmitting the BSTOA value.

4. A method for time synchronizing a plurality of base stations in a wireless communication system, comprising:
scheduling a plurality of cell timing measurements of at least one of a plurality of base stations;
making the cell timing measurements, wherein the making of the cell timing measurements includes:
  blanking a downlink physical synchronization channel in the plurality of base stations;
  receiving a burst signal in one of a plurality of base stations; and
  measuring the burst signal at the one of the plurality of base stations;
developing a plurality of time drift factor values for the at least one of the plurality of base stations; and
scheduling periodic time update transmissions to the at least one of the plurality of base stations.

5. A base station (BS) for a wireless digital system with the ability to time synchronize to at least one of a plurality of other base stations, comprising:
circuitry configured to detect at least one of a plurality of out-of-sync base stations;
circuitry configured to measure a plurality of cell timing signal values;
circuitry configured to receive a measured and sent base station time of arrival (BSTOA) value from the out-of-sync base station;
circuitry configured to correct the at least one of out-of-sync base stations, wherein the circuitry configured to correct includes circuitry configured to compare the at least one out-of-sync base station's BSTOA value with a stored BSTOA value found in a covariant matrix database;

circuitry configured to transmit a correction message and receive a report; and circuitry configured to update the covariant matrix database from data from the report.

6. The base station of claim 5 wherein the circuitry configured to detect includes:

updating a covariant matrix database with the plurality of cell timing signal values; and further circuitry configured to determine an out-of-sync base station from at least one of plurality cell timing signals.

7. A base station (BS) for a wireless digital system with the ability to time synchronize a plurality of other base stations, comprising:

circuitry configured to schedule a plurality of time sync measurements from at least one of a plurality of other base stations;

circuitry configured to develop a time sync drift pattern for the at least one of the plurality of other base stations and;

circuitry configured to schedule periodic update transmissions to the at least one of the plurality of other base stations;

circuitry configured to blank a plurality of downlink physical synchronization channels in a plurality of base stations; and circuitry configured to send a burst signal to at least one of the plurality of base stations to measure a BSTOA value from at least one of the plurality of base stations.

8. A base station (BS) for a wireless digital system with the ability to time synchronize a plurality of other base stations and which minimizes service interruption needed to time synchronize, comprising:

circuitry configured to schedule a plurality of time sync measurements from at least one of a plurality of other base stations;

circuitry configured to develop a time sync drift pattern for the at least one of the plurality of other base stations;

circuitry configured to schedule periodic frequency update transmissions to the at least one of the plurality of other base stations;

circuitry configured to blank a plurality of downlink physical synchronization channels in a plurality of base stations; and circuitry configured to send a burst signal to at least one of a plurality of base stations to measure a BSTOA value from at least one of a plurality of base stations.

\* \* \* \* \*

UNITED STATES PATENT AND TRADEMARK OFFICE
CERTIFICATE OF CORRECTION

| | | |
|---|---|---|
| PATENT NO. | : 7,813,311 B2 | Page 1 of 1 |
| APPLICATION NO. | : 10/322133 | |
| DATED | : October 12, 2010 | |
| INVENTOR(S) | : Dick et al. | |

It is certified that error appears in the above-identified patent and that said Letters Patent is hereby corrected as shown below:

ON THE TITLE PAGE

Item (56) OTHER PUBLICATIONS, page 2, right column, after "(Release 4)," 3GPP TS 25.402", delete "V5.1.0" and insert --V4.5.0--.

At column 2, line 2, after "accordance with", delete "6".

At column 2, line 64, after "a base station", delete "$30^{}_1$," and insert --$30_1$--.

At column 3, line 5, after "base stations", delete "$30,...30_n$" and insert --$30_1...30_n$--.

At column 9, line 7, after "going over the", delete "IUB" and insert --Iub--.

At column 10, line 18, before "of the measurement", delete "periodicy" and insert --periodicity--.

At column 10, line 44, after "will be higher", delete "that" and insert --than--.

Signed and Sealed this
Eighteenth Day of October, 2011

David J. Kappos
*Director of the United States Patent and Trademark Office*